United States Patent [19]
Rizzotti, III

[11] Patent Number: 4,596,049
[45] Date of Patent: Jun. 17, 1986

[54] ELECTRICAL CONTROL SYSTEM

[75] Inventor: Alfred E. Rizzotti, III, New Rochelle, N.Y.

[73] Assignee: Ward Leonard Electric Co., Inc., Mount Vernon, N.Y.

[21] Appl. No.: 559,908

[22] Filed: Dec. 9, 1983

[51] Int. Cl.⁴ .............................................. H04B 9/00
[52] U.S. Cl. .................................... 455/603; 455/612; 455/617; 455/606; 340/825.72
[58] Field of Search ............... 455/603, 606, 617, 612; 340/825.72, 825.69

[56]  References Cited
U.S. PATENT DOCUMENTS

| | | | |
|---|---|---|---|
| 4,124,776 | 11/1978 | Nocker | 455/603 |
| 4,161,651 | 7/1979 | Sano et al. | 455/603 |
| 4,422,180 | 12/1983 | Wendt | 455/603 |

Primary Examiner—Robert L. Griffin
Assistant Examiner—Timothy K. Greer
Attorney, Agent, or Firm—Bernard Malina

[57]  ABSTRACT

An electrical control system for controlling one or more electrical devices includes a local control station and one or more remote control stations, each station including a transmitter and a receiver, the various stations being interconnected by optical fibers for transmission of information between the stations. The local control station continuously encodes the status of the controlled electrical devices, and optically transmits this information to the various remote stations. Also, the receiver of each remote station is provided with means for determining when a fault in the local to remote station link occurs and determines whether it is receiving valid control information from the local station. An alarm signal is produced when the remote station receiver fails to receive control signal information.

19 Claims, 3 Drawing Figures

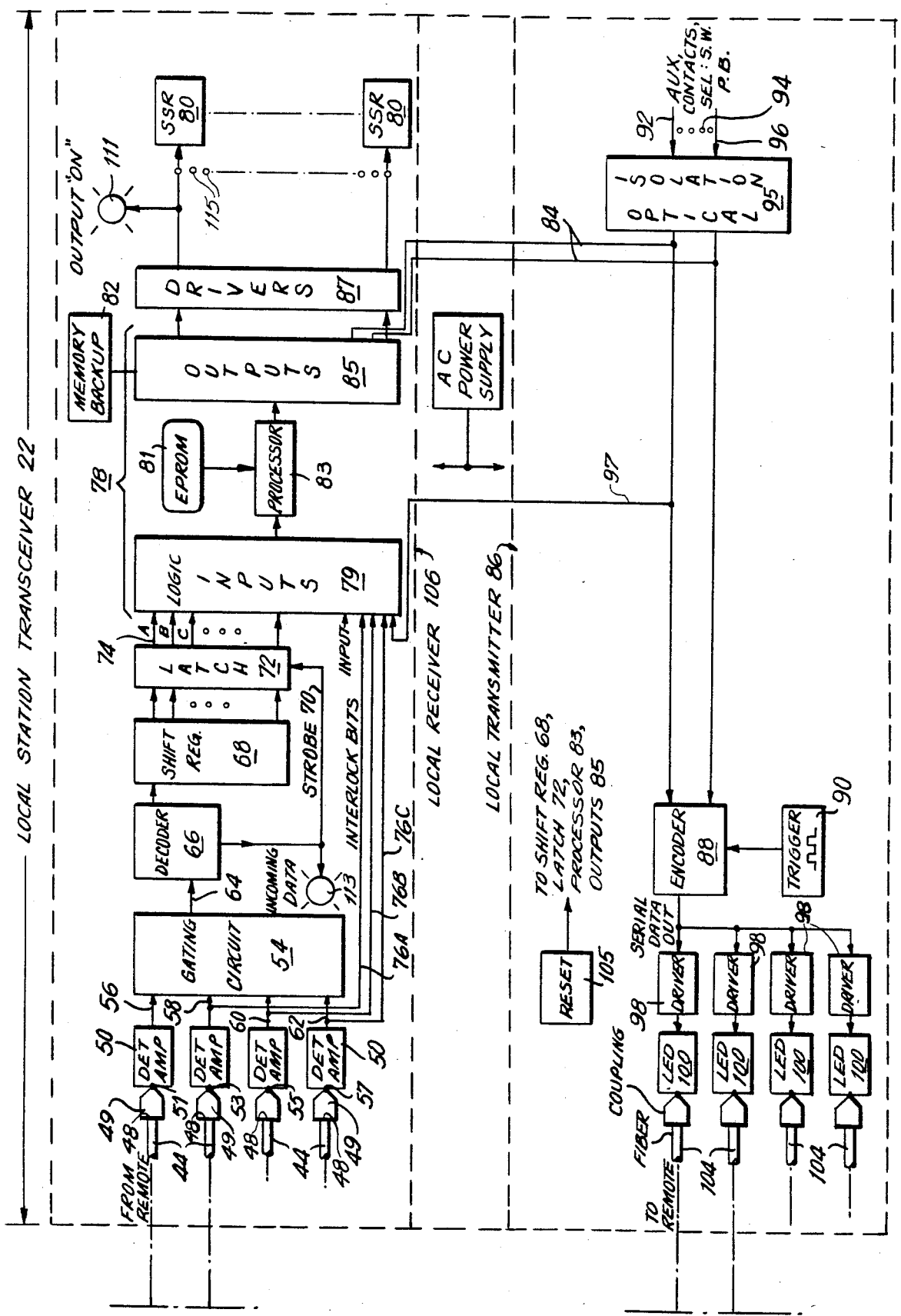

ELECTRICAL CONTROL SYSTEM

BACKGROUND OF THE INVENTION

The present invention relates to electrical control systems and more particularly to remote control systems for controlling electrical devices from a single or a plurality of remote stations.

Systems for controlling the startup and operation of electrical motors often require that the controlling functions be carried out at operating stations which are remote from the motors and their associated local controlling apparatus motor starters. Such operating stations may typically be up to about 1,000 feet or more away from the local controller apparatus which generally comprise a box enclosure containing high voltage power lines, contactors and relays, and include a switch mounted on the exterior thereof for selecting local or remote control operation. Conventionally, the remote control stations are "hard wired" to the local controller box by electrical conductor cable which adds substantially to the bulk and weight of the local controller box and accounts for a substantial portion of the installation cost of the system. In various applications, such as shipboard installations, the above-mentioned disadvantages become very significant, if not critical.

It is, therefore, an object of the present invention to provide a high reliability electrical control system which is of substantially reduced weight bulk.

It is a further object of the present invention to provide an electrical control system in accordance with the foregoing object which substantially eliminates EMI/RFI interference along the transmission channels thereof.

It is another object of the present invention to provide an electrical control system in accordance with the preceding objects which enables reduced installation costs.

It is yet another object of the present invention to provide a motor control system in accordance with the preceding objects which provides improved electrical isolation and eliminates electrical shock and spark/fire hazards.

SUMMARY OF THE INVENTION

The system of the present invention comprises a local control station and one or more remote control stations, each station including a transmitter and a receiver. Optical fibers are employed to establish the duplex link between the remote stations and the local controllers for transmission of command and control signal information therebetween. The remote stations are operative to encode pushbutton, selector switch and other data commands and transmit such command signals serially over the optical fiber to the local control station receiver, which decodes and implements the remote station commands through the local electrical devices, namely, contactors, relays, overloads and indicator lights at the local control station. Additionally, the local control station continually serially encodes the status of the controlled electrical devices, and through its transmitter optically transmits such information over one or more optical fibers back to the receivers of the various remote stations, to thereby complete the full duplex link between the local and remote stations. As a further feature of the present invention, the local transmitter continuously updates the receiver of each remote station. Thus, the remote receiver continually anticipates receipt of valid data from the local transmitter and when such data is not received, the remote receiver causes an alarm to be triggered to alert the operator that the displayed data may be invalid. Failure of the local station to transmit valid data to the remote station causes an alarm to be triggered at the remote station to indicate a fault, to thereby facilitate prompt corrective action.

Additional objects and advantages of the invention will become apparent during the course of the following specification when taken in conjunction with the accompanying drawings in which:

BRIEF DESCRIPTION OF THE DRAWINGS

FIGS. 2A and 2B are an electrical schematic diagram of a motor control system in accordance with the principles of the present invention.

DETAILED DESCRIPTION OF THE INVENTION

Figure 1:
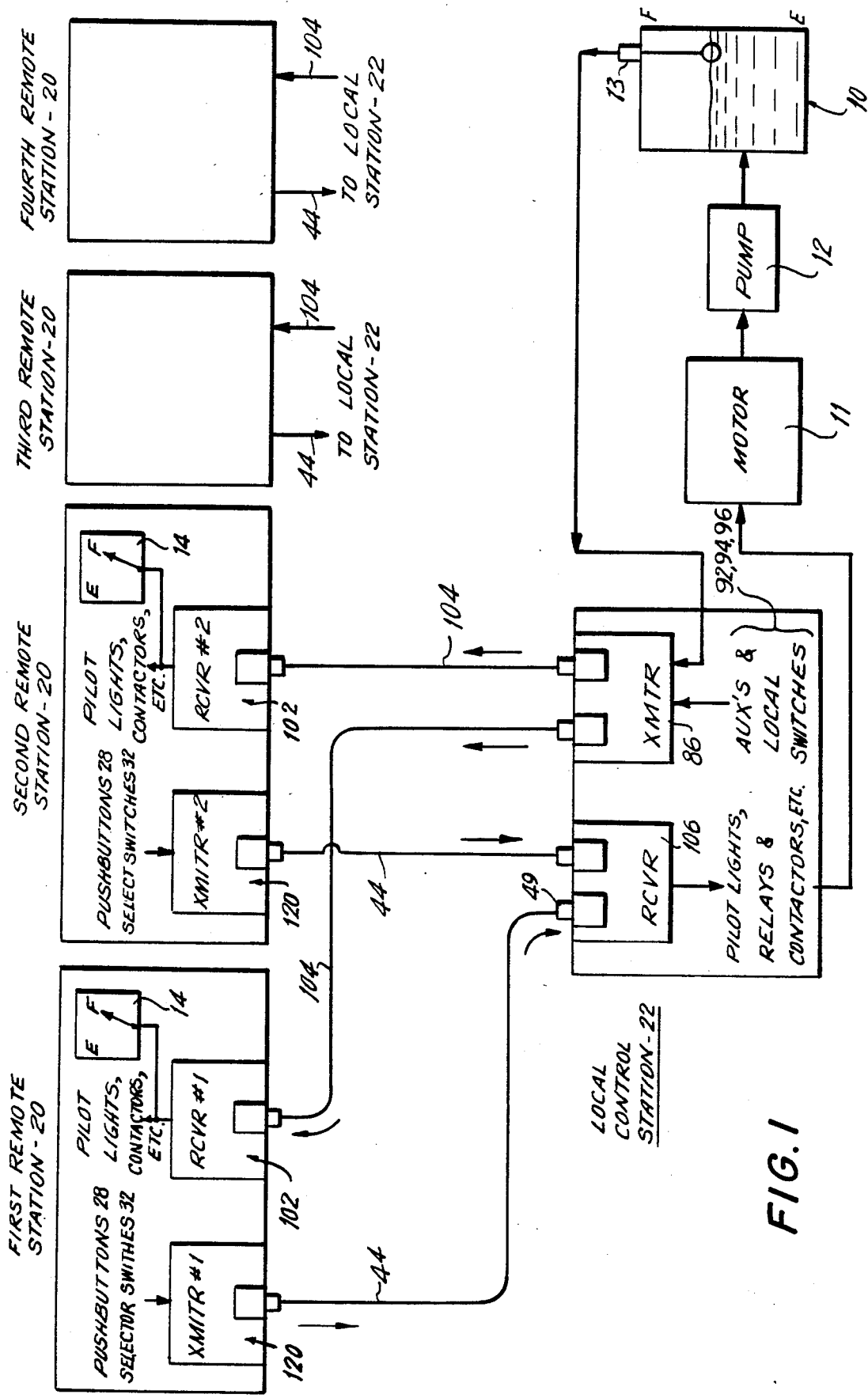
FIG. 1 is a simplified schematic representation of a control system in accordance with the present invention in a typical application, showing the control panels of the local and remote control stations and their interconnection.
Figure 2A:
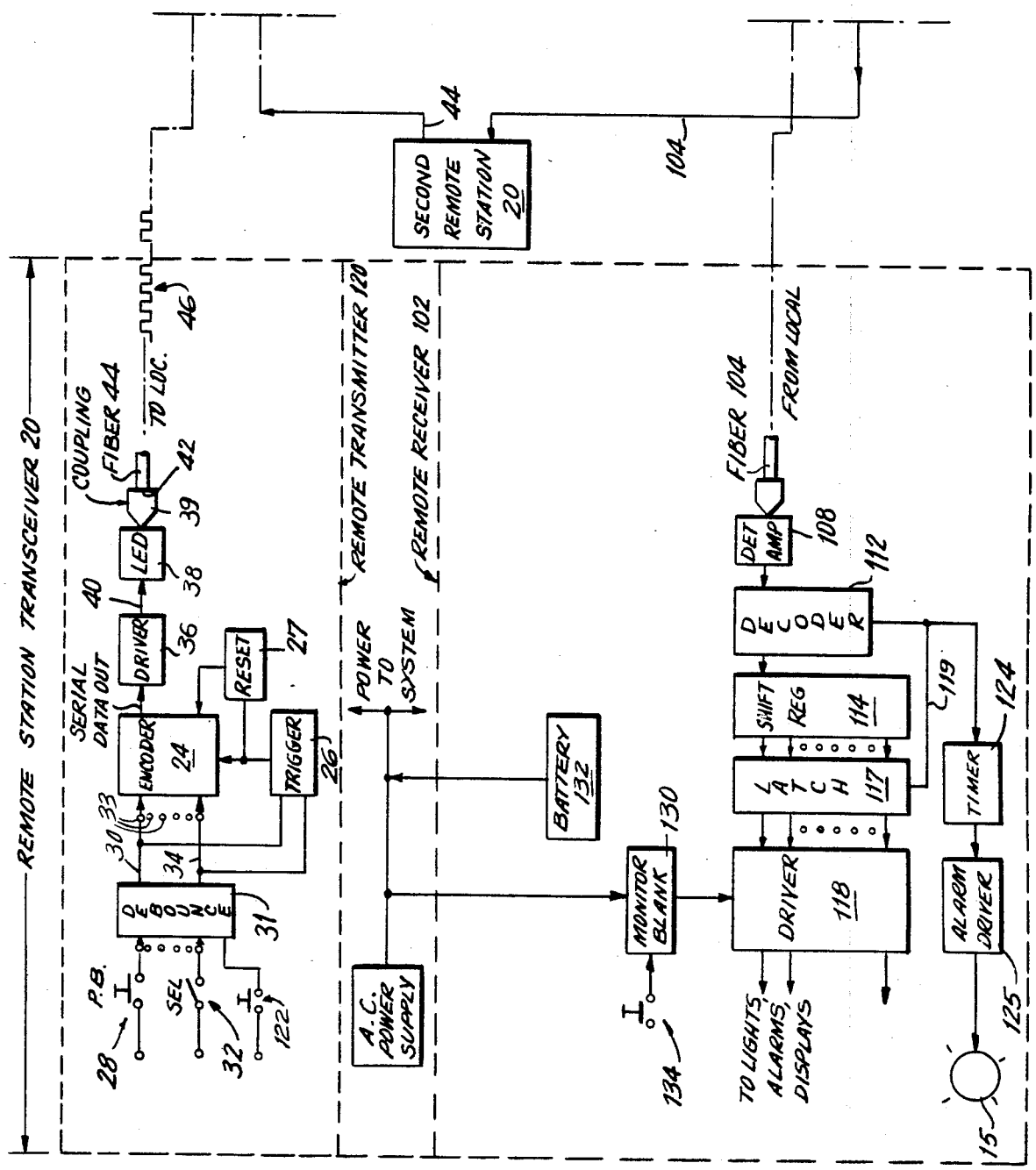

Referring to FIGS. 1 and 2 of the drawings, there is shown a control system in accordance with the principles of the present invention for transmission and reception of signals to and from one or more remote station transceivers 20 and a local station transceiver 22.

As shown in FIG. 1, by way of example of a typical application thereof, the local control station 22 is interfaced with four remote control stations 20 and the system is shown controlling the level of liquid in a tank 10. The remote stations 20 are operative to transmit motor control commands via single optical duplex fibers 44 which may typically be of 200 uM diameter to the local control station 22. At local control station 22 the commands are decoded and implemented, driving relays and/or contactors which might operate an electric motor 11, which drives a pump 12 in various speeds and directions to control the level of the liquid in tank 10.

As the motor contactors open and close in response to the command signals, auxiliary contacts in local control station 22 are encoded. The local transmitter transmits the encoded information back to the various remote stations 20 via single 200 uM optical duplex fibers 104 for pilot light display or other outputs. In response to the varying flow of liquid in and out of tank 10, liquid level sensor 13 provides liquid level signals to local control station 22 which transmits this information in encoded form via optical fibers 104 to the various remote control stations 20, where such information is decoded, as hereinafter described in greater detail. This liquid level information may also be displayed on a fluid level meter 14 or other type of display.

For purposes of explanation, the operation of the system has just been broadly described as applied to a single motor controlling the liquid level in a tank. It should be understood however, that the system is operative for controlling many electrical devices and apparatus of much greater complexity, as will hereinafter become apparent.

Referring now to FIG. 2, input control signal information is fed to an encoder 24 through data lines 33 and a trigger circuit 26, through debounce circuit 31 by means of momentary pushbutton switches 28 via lead 30 and selector switches 32 through lead 34. The leading and trailing edges of the pulses created by momentary activation of pushbutton switch 28 or selector switch 32 cause an oscillator in trigger circuit 26 to trigger encoder 24. Reset circuit 27 maintains the encoder 24 in a quiescent state unless trigger 26 is providing firing pulses to encoder 24.

When triggered, encoder 24 generates a serial Manchester bit (pulse) stream which contains synchronization and command information data bits which is applied to a driver circuit 36 which drives an infrared light emitting diode (IRLED) 38. Thus, the electrical pulses into IRLED 38 at input 40 are converted into infrared light pulses by IRLED 38, the output of which is coupled by means of a fiber optic connector 39 to the input end face 42 of optical glass fiber 44. Optical fiber 44 is operative, by internal reflection, to transmit the optical pulse stream 46 (which corresponds to the electrical pulse output of driver 36) along the entire length thereof to local station transceiver 22. The output end face 48 of fiber 44 is coupled by means of a fiber optic connector 49 to an optical detector amplifier 50 which is operative to convert the light pulses back to electrical pulses.

The electrical output of detector 50 is then fed to a gating (lock-out) circuit 54. As shown in FIG. 2, gating circuit 54 is provided with four input terminals 56, 58, 60, 62 to enable the transmission of command information to local station 22 from four separate remote stations through four transmission channels similar to that just described for input terminal 56. Gating circuit 54 is operative to allow the transmission through it of incoming command signal data only through one of the four channels during any given time period and thus inhibit or "lock-out" the remaining three channels. Of course, upon completion of the command signal transmission through the single channel, any one of the signals from the four remote station control channels may seek access to and transmission through gating circuit 54 to control the operation of local station 22.

The command signal output 64 from gating circuit 54 is then fed to a decoder 66 which is synchronized with incoming signal 64 and is operative to decode the received signal and determine whether the "word" is valid. The command signal data is then serially fed into a shift register 68. If the decoded "word" is valid, decoder 66 transmits a strobe pulse at 70 to latch circuit 72 which operates as a permanent register, latching the command signal data. The appearance of a strobe pulse at 70 also causes a visible light LED 113 to turn "ON" for a predetermined period, thus indicating to the operator the presence of valid incoming data.

The control signal data via the fifteen input leads 74A, B, C, . . . which are the recovered data bits from data lines 33, three interlock bits via leads 76A, 76B, 76C, and optically isolated inputs 97, are fed to a logic control unit 78 for decision making. Logic control unit comprises input circuitry 79, EPROM 81, a one-bit microprocessor 83 (e.g. Type MC 14500), and output circuitry 85. EPROM 81 includes software, i.e. a computer program for logical processing of the command bits, interlock bits and optically isolated inputs 97, to produce output data bits which respectively drive a series of output driver buffer stages 87 that drive solid state relays (SSR) 80. In addition, a backup battery source 82 is connected to the logic output circuitry 85 to provide memory for simulating a "low voltage release" form of control, the system being hard wired for either low voltage release or "low-voltage protection" form of control. Visible indicating lamps 111 show the status of all output lines 115.

An alternative use of optical input ports 53, 55 and 57 in local receiver 106 is provided. Thus, instead of using all four ports for connection to remote station 20, any one of these three ports may be fed with an optical interlock signal which will be either ON or OFF. These signals will be converted by detector/amplifier 50 to electrical two-state signals which are routed via leads 76A, 76B, 76C directly to logical control unit inputs 79 for processing. This is accomplished by hard wired jumpers (not shown) between detector amplifiers 50 and logic control inputs 79.

Processed signal data from logic control unit 78 is provided from two of the output terminals 84 of output stages 85 and is transmitted back to the remote station 20 by means of the transmitter portion 86 of transceiver 22. Thus, the control signal is applied at lead 84 to encoder 88 which operates in a manner similar to that described above with respect to encoder 24, except that encoder 88 is continuously triggered by trigger circuit 90. In addition to the control signal at 84, the other inputs 92, 94, 96 represent return signals, generated by the devices connected to local station 22 which are being controlled by remote station(s) 20, such as relay contacts, switches and auxiliary contacts (see FIG. 1) and are fed through an optical isolation circuit 95.

The serial data output of encoder 88 is thus fed to driver circuits 98 and IRLED'S 100 which convert such electrical signals into light pulses which are transmitted to the receiver portion 102 of remote station 20 via optical fibers 104 as described above with respect to optical fiber 44. It will be noted that like local receiver portion 106, remote receiver 102 comprises a detector amplifier 108, decoder 112, shift register 114 and a latching circuit 117. Receiver 102, however, does not include a logic control unit since the return signal data is simply latched by the strobe signal 119 and applied via driver circuit 118 to drive the display lights. Each remote transmitter 120 is provided with a test pushbutton 122 whose data bit is transmitted with the control signal to logic control unit 78 where it is decoded and "wrapped around" output 84 and thence transmitted back to remote receiver 102 where it energizes a lamp on the remote station box to confirm the proper functioning of the entire duplex link system, including logic control unit 78.

In order to inform the remote station operators that the indicating information which they receive is current, remote decoder 112 generates a repetitive clock trigger signal which corresponds to the frequency of the incoming command "words" which is applied to a timing circuit 124, the output of which is applied to alarm driver 125 which drives a link malfunction lamp 15.

If the retrigger pulse does not appear at timing circuit 124 after a preset time delay, timing circuit 124 produces and applies a warning signal to light driver 125 which energizes a flashing warning light. When the retrigger pulse reappears at timing circuit 124 it causes removal of the warning signal output from timing circuit 124 and the resultant extinguishing of the alarm or warning lamp. The lamp will remain extinguished unless retrigger pulses are missing. Energization of the alarm light would inform the operator at the remote station 20 of a fault in the system such as improper operation of the local transmitter 86, breakage of the optical fibers 104, loss of A.C. power at local transceiver 22, or malfunction in the remote receiver 102, thereby warning the operator that the indicated data being displayed may be invalid. A battery backup power supply 132 is provided for operation in the event of power failure.

A monitoring circuit 130 is operative to sense the loss of normal A.C. power for the remote station 20, however, the primary battery source 132 will continue to power all circuitry without interruption of service for a predetermined period of time which is dependent upon the ampere hour rating of the battery 132. In order to extend the operational life of the battery 132, monitoring circuit 130 is operative to apply a blanking signal to light driver 118 when normal power is lost, causing all indicating lights to turn "off". Push-to-view momentary pushbutton switch 134 allows the user to observe the status of the lights while switch 134 is held depressed during an A.C. power failure.

Referring again to local receiver 106, upon "power-up", reset circuit 105 sets shift register 68, latch 72, processor 83 and output 85 to the "cleared" state, except when the system is used in the low voltage release (LVR) mode. In the LVR mode, memory backup battery 82 maintains power to several critical circuits including output 85 so that the operating state at the time of power failure is "remembered" upon resumption of normal electrical power.

When the system is being operated at local control station 22, which is known as "local control" operation, status of the motor may be monitored by the logic control unit via input feedback lines 97, to insure that the logic control unit outputs 85 continue to follow the operating conditions of the motor. This is implemented to insure that when operating in one mode, selection of remote operation will not disturb the continued operation of the control system.

It should be noted that the system has the capability of eight user-selectable 256-step programs or four 512-step programs stored in EPROM 81, which are selectable by handwire jumpers (not shown) on logic control unit 78. Furthermore, logic inputs circuit 79 has additional inputs which may be comprised of output signals 115 or input signals 97 from optical isolation circuit 95. By allowing the selection of either three interlock bits 76A, 76B, 76C, or three local device inputs 92, 94, 96, or three wrap-around outputs 115, or any combination of these arrangements, flexibility is added to the system.

Output lines 115 are provided with visible light LED's 111 to visually indicate the output states of drivers 87.

A conventional standard type 2-speed, 2-winding reversing motor controller system (not shown) typically includes a local control station and one or more remote stations, one of which is designated a "Central Control". Such an installation typically requires a bundle of 13 electrical conductor copper lead wires for interconnection of each remote station with the local station, each for runs of about 100 feet. Assuming the use of standard 14-conductor MHOF-14 cable, the resulting cable weight for the two runs is about 46 pounds. This cable weight will normally be even further increased under usual conditions by an additional 10-15% due to the addition of space conductors in the cable as ordinarily called for in designs of this kind. Of course, many installations require substantially more than two cable runs where there are more than two remote stations, thereby increasing the bulk and weight of the cables to burdensome, if not unacceptable levels.

Many immediate advantages over the conventional multiconductor copper wire control system are thus obtained by the use of glass optical fibers. First, whereas two runs of conventional copper wire cable weighs about 230 pounds per 1,000 feet, optical glass 200 uM duplex fiber weighs only about 6.5 pounds per 1,000 feet, resulting in a total fiber weight of 1.3 pounds as compared with 46 pounds for two 100 foot runs.

Second, the cross-section dimension of typical duplex fiber cables is about $3.8 \times 2.54$ mm., whereas the diameter of MHOF-14 cable is about 16 mm. Accordingly, the substantial reduction in bulk provided by the use of optical fiber avoids congestion of the wireways.

Furthermore, the optical glass fibers have a much greater signal information carrying capacity. Accordingly, expansion of the number of control functions in the system would not require additional optical fibers, whereas the electrical cables would require additional conductor wires and/or more cables, thus increasing the size and weight thereof correspondingly.

Various other advantages are obtained by the use of optical glass fibers in lieu of copper conductors. Installation of the optical fibers is substantially simple and more easily accomplished because once the fiber has been "pulled" to the termination locations, only two "screw-on" connections to the exterior of the box enclosures are required as compared to the 13 electrical connections necessary in the conventional controller system. Additionally, the use of optical glass fibers eliminates the risk of fire or explosion due to the severing of the signal carrying cable. Thus, severance of a copper cable may produce an electrical arc which may cause a fire or explosion or shock hazard, whereas no such danger is created in the case of glass fibers which carry light pulses. This intrinsic safety advantage is a critical factor where the control signal cables must be routed through a hazardous atmosphere or where personnel shock hazards are possible. Thus, the use of armor to protect the control signal link may be avoided.

Also, in contrast to copper cables, optical glass fibers are immune to electromagnetic/radio interference (EMI/RFI) which is a matter of growing concern in connection with the use of sensitive electronic equipment in the factory and on shipboard. Thus, conventional copper cable is likely to conduct such EMI/RFI interference from the motor controller and/or pick-up further interference noise along its length, transmitting such noise to a remote location with obviously undesirable consequences.

While a preferred embodiment of the invention has been shown and described herein, it is obvious that numerous omissions, changes and additions may be made in such embodiment without departing from the spirit and scope of the invention.

What is claimed is:

1. An electrical control system for controlling the operation of one or more electrical devices comprising
   a local control station and at least one remote control station;
   each of said local control stations comprising transmitter means and receiver means, and each of said remote control stations comprising transmitter means and receiver means;
   first optical fiber means interconnecting said remote station transmitter means and said local station receiver means, and second optical fiber means interconnecting said local station transmitter means with said remote station receiver means, said remote station transmitter means including command means for generating electrical command words, and first converting means for converting said electrical command words into corresponding light command words;

said remote station transmitter means including first coupling means for coupling said light command words to the input end of said first optical fiber means;

said local station receiver means including second coupling means for coupling the output end of said first optical fiber means to said local station receiver means and second converting means for converting said light command words into corresponding serial bit stream electrical command signals;

decoder means for decoding said serial bit stream command signals into data command information words;

a logic control unit comprising microprocessor means and erasable programmable memory means for processing said data command information words;

driver circuit means for driving said electrical devices in accordance with said data command information;

local station monitoring means for monitoring the operation of said electrical devices and producing corresponding electrical control information signals;

third converting means for converting said electrical control information signals into corresponding light control information signals;

third coupling means for coupling said light control information signals to the input end of said second optical fiber means;

fourth coupling means for coupling the output end of said second optical fiber means to said remote station receiver means; and fourth converter means for converting said light control information signals into electrical control information signals.

2. An electrical control system as defined in claim 1 including display means for displaying the control information at said remote control station.

3. An electrical control system as defined in claim 1 wherein each of said remote station receiver means comprises updating means operative to produce an alarm signal when said remote station receivers fail to receive valid control information from said local control station.

4. An electrical control system as defined in claim 1 wherein said first converting means comprises infrared light emitting diode means.

5. An electrical control system as defined in claim 1 wherein said local station receiver means comprises gating circuit means operative to selectively transmit said electrical command signals from said second converting means to said decoder means, and said decoder means is operative to determine whether the command information contained in said serial bit stream electrical command signals is valid.

6. An electrical control system as defined in claim 1 wherein said local station receiver means includes valid command information display means for indicating the reception of valid command information by said local station receiver means.

7. An electrical control system as defined in claim 6 wherein said logic control unit is operative in response to said command information and condition of said electrical devices to produce output driving signals and said local station receiver means includes output circuit means connected to said logic control unit for driving said electrical devices.

8. An electrical control system as defined in claim 7 wherein said second converting means comprises detector means for detecting additional status signals corresponding to the status of apparatus controlled by said electrical devices and generating interlock data signals in response thereto, and means for applying said interlock data signals to said logic control unit.

9. An electrical control system as defined in claim 8 wherein said third converting means comprises infrared light emitting diode means.

10. An electrical control system as defined in claim 3 wherein said remote station receiver means comprises decoder means for converting serial bit stream control data signals into parallel data control information signals.

11. An electrical control system as defined in claim 10 wherein said remote station receiver means comprises monitor means for determining the validity of the control information signals received by said remote station receiver means, said monitor means comprising timer means for detecting the interval between data words received by said decoder means and selectively producing an alarm signal when said data word interval does not correspond to a preselected time period.

12. An electrical control system for controlling the operation of one or more electrical devices comprising
a local control station and at least one remote control station;
each of said local control stations comprising transmitter means and receiver means, and each of said remote control stations comprising transmitter means and receiver means;
first optical fiber means interconnecting said remote station transmitter means and said local station receiver means;
and second optical fiber means interconnecting said local station transmitter means with said remote station receiver means,
said remote station transmitter means including command means for generating electrical command words, and
first converting means for converting said electrical command words into corresponding light command words;
said remote station transmitter means including first coupling means for coupling said light command words to the input end of said first optical fiber means;
said local station receiver means including second coupling means for coupling the output end of said first optical fiber means to said local station receiver means and
second converting means for converting said light command words into corresponding serial bit stream electrical command signals;
decoder means for decoding said several bit stream command signals into data command information words;

a logic control unit for processing said data command information words;

driver circuit means for driving said electrical devices in accordance with said data command information;

local station monitoring means for monitoring operation of said electrical devices and producing corresponding electrical control information signals;

third converting means for converting said electrical control information signals into corresponding light control information signals;

third coupling means for coupling said light control information signals to the input end of said second optical fiber means;

fourth coupling means for coupling the output end of said second optical fiber means to said remote station receiver means; and fourth converter means for converting said light control information signals into electrical control information signals;

each of said remote station receiver means comprising updating means operative to produce an alarm signal when said remote station receivers fail to receive valid control information from said local control station;

said remote station receiver means comprising decoder means for converting serial bit stream control data signals into parallel data control information signals;

said remote station receiver means comprising monitor means for determining the validity of the control information signals received by said remote station receiver means, said monitor means comprising timer means for detecting the interval between data words received by said decoder means and selectively producing an alarm signal when said data word interval does not correspond to a preselected time period;

said remote station receiver comprising driver means for driver display means in accordance with said parallel data control information signals and said remote station comprises A.C. power sensing means operative to produce and apply an inhibiting signal to said remote station driver means to inhibit the output of said driver means.

13. An electrical control system as defined in claim 1, wherein said command means comprises comand input means for receiving input commands.

14. An electrical control system as defined in claim 13, wherein said command means comprises encoder means for converting said input commands to said electrical command words.

15. An electrical control system as defined in claim 14, wherein said electrical command words are in parallel form.

16. An electrical control system as defined in claim 15, wherein said encoder means converts said parallel electrical words to electrical serial command words coded in Manchester format.

17. An electrical control system for controlling the operation of one or more electrical devices comprising:

a local control station and at least one remote control station;

each of said local control stations comprising transmitter means and receiver means, and each of said remote control stations comprising transmitter means and receiver means;

first optical fiber means interconnecting said remote station transmitter means and said local station receiver means;

and second optical fiber means interconnecting said local station transmitter means with said remote station receiver means, said remote station transmitter means including command means for generating electrical command words, and first converting means for converting said electrical command words into corresponding light command words;

said remote station transmitter means including first coupling means for coupling said light command words to the input end of said first optical fiber means;

said local station receiver means including second coupling means for coupling the output end of said first optical fiber means to said local station receiver means and second converting means for converting said light command words into corresponding serial bit stream electrical command signals;

decoder means for decoding said serial bit stream command signals into data command information words;

a logic control unit for processing said data command information words;

driver circuit means for driving said electrical devices in accordance with said data command information;

local station monitoring means for monitoring the operation of said electrical devices and producing corresponding electrical control information signals;

third converting means for converting said electrical control information signals into corresponding light control information signals;

third coupling means for coupling said light control information signals to the input end of said second optical fiber means;

fourth coupling means for coupling the output end of said second optical fiber means to said remote station receiver means; and fourth converter means for converting said light control information signals into electrical control information signals;

said local station receiver means comprising gating circuit means operative to selectively transmit said electrical command signals from said second converting means to said decoder means, and said decoder means is operative to determine whether the command information contained in said serial bit stream electrical command signals is valid;

said gating circuit means being operative to selectively transmit said electrical command signals to said decoder means in accordance with the time of arrival of said electrical command signals at said gating circuit means.

18. An electrical control system as defined in claim 17, comprising a plurality of said remote control stations, wherein said first optical fiber means comprises a plurality of optical fibers, each of which separately interconnects said local station receiver means with the transmitter means of one of said remote stations.

19. An electrical control system as defined in claim 18, wherein said second optical fiber means comprises a plurality of optical fibers, each of which separately interconnects said local station transmitter means with the receiver means of one of said remote stations.

* * * * *